Z. G. SHOLES.
COMBINED MIXER AND SPRINKLER.
APPLICATION FILED SEPT. 16, 1908. RENEWED SEPT. 14, 1909.
967,450.
Patented Aug. 16, 1910.
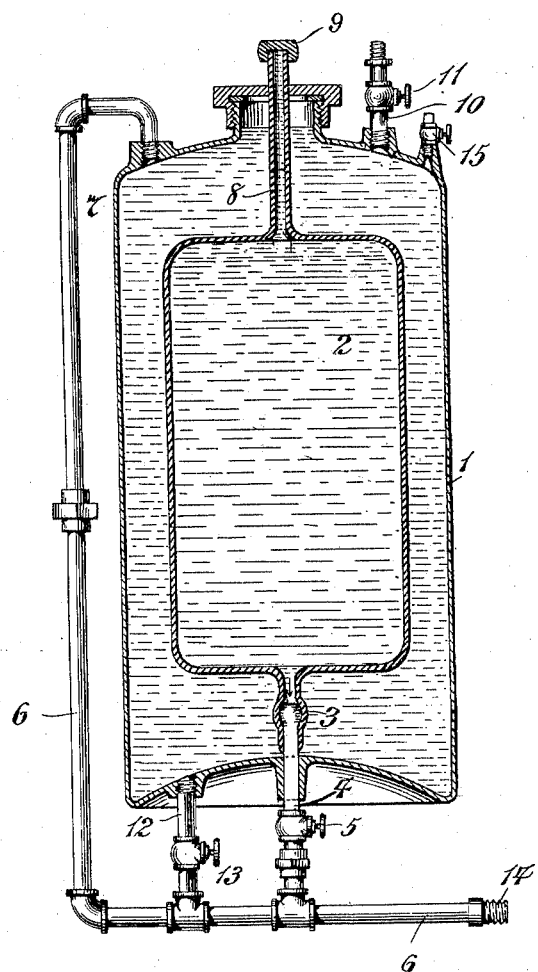
Witnesses:
Edward Rowland
May A. Butler
Zalmon G. Sholes
Inventor
By his Attorney H. S. MacKaye

UNITED STATES PATENT OFFICE.

ZALMON G. SHOLES, OF NEW YORK, N. Y., ASSIGNOR TO WEST DISINFECTING COMPANY, A CORPORATION OF NEW YORK.

COMBINED MIXER AND SPRINKLER.

967,450.   Specification of Letters Patent.   Patented Aug. 16, 1910.

Application filed September 16, 1908, Serial No. 453,281. Renewed September 14, 1909. Serial No. 517,749.

*To all whom it may concern:*

Be it known that I, ZALMON G. SHOLES, a citizen of the United States, residing in the borough of Manhattan, city, county, and State of New York, have invented a certain new and useful Improvement in Combined Mixers and Sprinklers, of which the following is a specification.

The present invention relates to an inexpensive and reliable device which can easily be made portable, whereby liquids may be intimately and perfectly mixed, the proportions being varied at will, and delivered in the form of a jet under pressure. The apparatus in question is particularly suited and intended for spraying a mixture of disinfectant fluid and water, but I do not limit myself to this application of the device.

The accompanying drawing shows in section a form of apparatus embodying a preferred form of my invention.

A strong air tight outer vessel is used, preferably in the form shown in the drawings at 1. Within this vessel is located an interior receptacle, 2, of collapsible nature. I prefer to make this receptacle of rubber, leather or the like, but any material or construction which makes this element collapsible is within my invention.

At one end, the receptacle 2 communicates, as by the rubber tube 3, with the exterior branch pipe 4, provided with a valve, as 5, and opening into the main delivery tube 6. This main delivery tube communicates with the interior of the outer vessel 1, and may be carried around to the opposite end thereof, as shown at 7 in the drawing.

When the apparatus is in use, the disinfectant or other material to be mixed with water and sprinkled is introduced into the receptacle 2 through the pipe 8, the valve 5 being closed. When the receptacle 2 is filled, the screw cap 9 closes the pipe 8. The inlet pipe 10 communicates with any source of water under pressure (as, for instance, the city water mains) and the entrance of water into the vessel 1 is controlled by the valve 11. The pipe 12 and valve 13 are to be used when it is desired to empty the vessel 1.

The hose pipe or other sprinkling instrument is fixed to the open end 14 of the main pipe 6.

When the apparatus is in operation, the vessel 1 and receptacle 2 being both filled with water and the liquid to be mixed therewith respectively, the pressure existing within the vessel 1, and transmitted thereto from the source of water supply, acts to expel liquid from the inner receptacle 2, and the rapidity of flow is governed by the valve 5. The water itself passes out under its original pressure through the main pipe 6, and at the point where it passes the pipe 4, the liquid from the inner receptacle becomes thoroughly mixed with it, and the mixture passes at once to the sprinkling means through the opening 14. This operation continues so long as the valves 5 and 11 are open, or until the receptacle 2 is emptied.

At 15 is shown an air valve which may be opened when the water is first admitted to the vessel 1.

It is best for operation of this device that the water discharged in use of the same should be drawn from a point sufficiently elevated above the bottom of the container 1 to produce adequate pressure, and in order to get as much pressure as possible I prefer to carry the pipe 6 around to a point 7 at the top of the container. If the outlet 12 were used for the purpose of mixing, it would either have to be made considerably smaller than the water inlet, or it would let the water run right through the container without creating any pressure upon the surface of the inner receptacle. By employing the preferred arrangement shown, the weight of water in the outer casing is made available to create the expelling pressure upon the inner receptacle and at the same time I can use as large an outlet tube as I please.

Various changes may be made in the construction of this device without departing from my invention, and I do not limit myself to the details herein shown and described.

What I claim is—

1. A mixer and sprinkler comprising in combination an outer vessel, a collapsible inner receptacle, a main delivery pipe and means whereby communication is established between said pipe and said vessel and receptacle respectively, substantially as described.

2. A mixer and sprinkler comprising in combination an outer vessel, an inner collapsible receptacle, a supply tube and an exit pipe extending from said receptacle to points outside of said vessel and a main delivery pipe communicating with said exit pipe and with the interior of said outer vessel, substantially as described.

3. A mixer and sprinkler comprising in combination an outer vessel, means for leading liquid under pressure thereto, a main delivery tube, an interior collapsible receptacle, a pipe connecting one end of said receptacle with the delivery tube and a supply pipe leading from the opposite end of said receptacle to a point outside of said outer vessel, substantially as described.

4. A mixer and sprinkler comprising in combination an outer vessel, means for supplying liquid under pressure thereto, a delivery pipe leading from the upper end of said vessel partly around the same and across the lower end thereof, an interior collapsible receptacle, a branch pipe leading therefrom to the delivery pipe where it crosses the end of the outer vessel, and means for supplying liquid to said interior receptacle, substantially as described.

ZALMON G. SHOLES.

Witnesses:
H. S. MACKAYE,
M. A. BUTLER.